(12) United States Patent
Yomo et al.

(10) Patent No.: US 9,521,613 B2
(45) Date of Patent: Dec. 13, 2016

(54) WIRELESS BASE STATION AND WIRELESS COMMUNICATION SYSTEM USING THE SAME

(75) Inventors: Hiroyuki Yomo, Soraku-gun (JP); Yoshihisa Kondo, Soraku-gun (JP); Suhua Tang, Soraku-gun (JP); Sadao Obana, Soraku-gun (JP); Tetsuya Ito, Tokyo (JP); Akira Matsumoto, Tokyo (JP); Koichi Yoshimura, Tokyo (JP)

(73) Assignees: Advanced Telecommunications Research Institute International, Kyoto (JP); NEC Communication Systems, LTD., Tokyo (JP)

( * ) Notice: Subject to any disclaimer, the term of this patent is extended or adjusted under 35 U.S.C. 154(b) by 148 days.

(21) Appl. No.: 14/000,773

(22) PCT Filed: Feb. 16, 2012

(86) PCT No.: PCT/JP2012/053611
§ 371 (c)(1),
(2), (4) Date: Aug. 21, 2013

(87) PCT Pub. No.: WO2012/114968
PCT Pub. Date: Aug. 30, 2012

(65) Prior Publication Data
US 2013/0336188 A1    Dec. 19, 2013

(30) Foreign Application Priority Data
Feb. 23, 2011    (JP) .................................. 2011-037031

(51) Int. Cl.
*H04W 52/02*    (2009.01)
(52) U.S. Cl.
CPC ........... *H04W 52/0206* (2013.01); *Y02B 60/50* (2013.01)

(58) Field of Classification Search
CPC .................................................. H04W 52/0206
(Continued)

(56) References Cited

U.S. PATENT DOCUMENTS

| 6,501,999 | B1 * | 12/2002 | Cai ....................... G06F 1/3203 |
| | | | 700/82 |
| 6,842,460 | B1 * | 1/2005 | Olkkonen et al. ............ 370/465 |

(Continued)

FOREIGN PATENT DOCUMENTS

| JP | 2007-104174 A | 4/2007 |
| JP | 2007-526655 A | 9/2007 |

(Continued)

OTHER PUBLICATIONS

International Search Report dated May 22, 2012, issued in corresponding application No. PCT/JP2012/053611.

*Primary Examiner* — Parth Patel
(74) *Attorney, Agent, or Firm* — Westerman, Hattori, Daniels & Adrian, LLP

(57) ABSTRACT

A wireless base station (1) includes a wakeup device (13) and a main device (14). When the main device (14) is in a sleep mode, the wakeup device (13) is connected to the antenna (11). Then, when the wakeup device (13) receives a wakeup signal for activating the wireless base station (1) from a terminal device assigned to the wireless base station (1) in a communication band used for wireless communication with the terminal device and when the information for identifying a wireless base station to be activated contained in the received wakeup signal is identical with the identification information of the wireless base station (1), the wakeup device (13) outputs a driving signal to the main device (14). The main device (14) transitions from the sleep mode to an operating mode in response to the driving signal from the wakeup device (13).

5 Claims, 9 Drawing Sheets

(58) Field of Classification Search
USPC ........ 370/311, 338, 256, 345; 455/522, 502, 455/466, 227
See application file for complete search history.

(56) References Cited

U.S. PATENT DOCUMENTS

| | | | |
|---|---|---|---|
| 6,980,839 B2 | 12/2005 | daCosta | |
| 7,756,548 B2 | 7/2010 | Laroia et al. | |
| 8,629,769 B2* | 1/2014 | Bruce | A61B 5/0002 340/10.1 |
| 2001/0001616 A1* | 5/2001 | Rakib et al. | 375/259 |
| 2001/0017852 A1* | 8/2001 | Skoog et al. | 370/335 |
| 2001/0041551 A1* | 11/2001 | Rotzoll | 455/343 |
| 2004/0017824 A1* | 1/2004 | Koenck et al. | 370/466 |
| 2004/0141490 A1* | 7/2004 | Hong | 370/345 |
| 2004/0221187 A1* | 11/2004 | Durand et al. | 713/300 |
| 2005/0054389 A1* | 3/2005 | Lee et al. | 455/574 |
| 2005/0064829 A1* | 3/2005 | Kang et al. | 455/127.1 |
| 2005/0136833 A1* | 6/2005 | Emeott et al. | 455/11.1 |
| 2006/0220843 A1* | 10/2006 | Broad et al. | 340/539.23 |
| 2007/0066273 A1* | 3/2007 | Laroia et al. | 455/343.2 |
| 2007/0066329 A1* | 3/2007 | Laroia et al. | 455/502 |
| 2008/0079589 A1* | 4/2008 | Blackadar | A61B 5/11 340/573.1 |
| 2008/0082847 A1* | 4/2008 | Lee et al. | 713/323 |
| 2008/0123577 A1* | 5/2008 | Jaakkola et al. | 370/311 |
| 2009/0016252 A1* | 1/2009 | Ho et al. | 370/311 |
| 2009/0052417 A1 | 2/2009 | Sakamoto et al. | |
| 2009/0058663 A1* | 3/2009 | Joshi et al. | 340/584 |
| 2009/0191922 A1* | 7/2009 | Rokusek | H04M 1/6075 455/569.2 |
| 2009/0291656 A1* | 11/2009 | Le Reverend et al. | 455/227 |
| 2009/0304057 A1* | 12/2009 | Werner et al. | 375/222 |
| 2010/0002614 A1* | 1/2010 | Subrahmanya | H04W 52/244 370/311 |
| 2010/0123560 A1* | 5/2010 | Nix et al. | 340/10.4 |
| 2010/0142426 A1 | 6/2010 | Taniuchi et al. | |
| 2010/0267403 A1* | 10/2010 | Lungaro et al. | 455/466 |
| 2011/0102157 A1* | 5/2011 | Tarkoma | 340/10.33 |
| 2011/0256899 A1* | 10/2011 | Khazei | 455/517 |
| 2012/0082065 A1* | 4/2012 | Yanagihara et al. | 370/256 |

FOREIGN PATENT DOCUMENTS

| | | |
|---|---|---|
| JP | 2009-509464 A | 3/2009 |
| JP | 2009-510835 A | 3/2009 |
| JP | 2009-077375 A | 4/2009 |
| JP | 2009-182619 A | 8/2009 |
| JP | 2009-232103 A | 10/2009 |
| JP | 2010-010919 A | 1/2010 |
| JP | 2010-130096 A | 6/2010 |
| JP | 2011-527163 A | 10/2011 |
| WO | 2010/002991 A1 | 1/2010 |

* cited by examiner

WIRELESS BASE STATION AND WIRELESS COMMUNICATION SYSTEM USING THE SAME

TECHNICAL FIELD

The present invention relates to a wireless base station and wireless communication systems using the same.

BACKGROUND ART

Wireless communication systems with reduced power consumption are known (see Patent Documents 1 and 2). The wireless communication system of Patent Document 1 includes a host, a router and an end device.

The router relays wireless communications between the host and end device. Each of the router and end device has a sleep mode and an active mode. In sleep mode, a communication function based on Zigbee (Registered Trademark) is off; in active mode, the communication function based on Zigbee is on.

When the end device in sleep mode detects a temperature abnormality by means of a temperature sensor connected with it, it transmits a WAKE-UP signal to the router. When the router receives the WAKE-UP signal from the end device, it transitions from sleep mode to active mode to relay wireless communications between the end device and host.

The router has wireless circuitry for normal wireless communications, where only two circuits, i.e. the frequency conversion circuit and radio field intensity detection circuit, are active in sleep mode to detect WAKE-UP signals.

The wireless communication system of Patent Document 2 includes an in-band communication device and an out-of-band communication device. The out-of-band communication device is connected to the in-band communication device. The out-of-band communication device receives out-of-band wireless communication information to activate the in-band communication device, thereby causing the in-band communication device to transition from sleep mode to active mode.

Patent Document 1: JP 2007-104174 A
Patent Document 2: JP 2007-526655 A

DISCLOSURE OF THE INVENTION

The wireless communication system disclosed in Patent Document 1 uses part of the wireless circuitry for normal wireless communications to detect WAKE-UP signals, and therefore it is difficult to sufficiently reduce the power consumption of the end device and router.

In the wireless communication system disclosed in Patent Document 2, the out-of-band communication device receives out-of-band wireless communication information to activate the in-band communication device, and therefore it is impossible to activate the in-band communication device using the communication band for the in-band communication device.

The present invention was made to solve these problems. An object of the present invention is to provide a wireless base station with reduced power consumption and that can be activated using a frequency band for normal wireless communications.

Another object of the present invention is to provide a wireless communication system including a wireless base station with reduced power consumption and that can be activated using a frequency band for normal wireless communications.

According to an embodiment of the present invention, a wireless base station includes a main device and a wakeup device. The main device has an operating mode in which the main device regularly transmits a management frame for managing a terminal device and communicates wirelessly with the terminal device, and a sleep mode in which the main device is not capable of communicating wirelessly with the terminal device, and may transition from the operating mode to the sleep mode when it has not communicated wirelessly with the terminal device in a certain period of time or when no terminal device is assigned to the wireless base station. When the main device is in the sleep mode and when the wakeup device receives, from a first terminal device attempting to initiate access to the main device, a wakeup signal for causing the main device to transition from the sleep mode to the operating mode, the wakeup device causes the main device to transition from the sleep mode to the operating mode. The wakeup device receives the wakeup signal from the first terminal device in the same frequency band as that used by the main device for wireless communication, the wakeup signal having been modulated by a modulation technique with a transmission rate lower than that for data transmission and reception by the main device in the operating mode, the wakeup signal containing information identifying a wireless base station to be activated by the first terminal device, and demodulates the received wakeup signal to cause the main device to transition from the sleep mode to the operating mode.

Further, in an embodiment of the present invention, a wireless base station includes a main device and a wakeup device. The main device has an operating mode in which the main device regularly transmits a management frame for managing a terminal device and communicates wirelessly with the terminal device, and a sleep mode in which the main device is not capable of communicating wirelessly with the terminal device, and may transition from the operating mode to the sleep mode when it has not communicated wirelessly with the terminal device in a certain period of time or when no terminal device is assigned to the wireless base station. When the main device is in the sleep mode and when the wakeup device receives, from a first terminal device attempting to initiate access to the main device, a wakeup signal for causing the main device to transition from the sleep mode to the operating mode, the wakeup device causes the main device to transition from the sleep mode to the operating mode. The wakeup device receives the wakeup signal from the first terminal device, the wakeup signal having a length that provides identification information for identifying a wireless base station to be activated by the first terminal device, and demodulates the received wakeup signal to cause the main device to transition from the sleep mode to the operating mode.

In the wireless base station of an embodiment of the invention, the main device may transition from the operating mode to the sleep mode under certain conditions. The wakeup device may receive the wakeup signal in the same frequency band as that used by the main device for wireless communication, the wakeup signal having been modulated by a modulation technique with a transmission rate lower than that for data transmission and reception by the main device in the operating mode. The wakeup device may then demodulate the wakeup signal to cause the main device to transition from the sleep mode to the operating mode. In this implementation, the wakeup device demodulates a wakeup signal that has been modulated by a modulation technique with a low transmission rate, meaning that the power consumption of the wakeup device is low.

As such, the power consumption may be reduced and a frequency band for normal wireless communications may be used to cause the wireless base station to transition from sleep mode to operating mode.

Further, in the wireless base station of an embodiment of the invention, the main device may transition from the operating mode to the sleep mode under certain conditions. The wakeup device may receive the wakeup signal in the same frequency band as that used by the main device for wireless communication, the wakeup signal having a length that provides information identifying a wireless base station to be activated by the first terminal device. The wakeup device may then demodulate the wakeup signal to cause the main device to transition from the sleep mode to the operating mode. In this implementation, the wakeup device measures the length of the wakeup signal to identify the wireless base station to be activated by the first terminal device, meaning that the power consumption of the wakeup device is low.

As such, the power consumption may be reduced and a frequency band for normal wireless communications may be used to cause the wireless base station to transition from sleep mode to operating mode.

BEST MODES FOR CARRYING OUT THE INVENTION

Figure 1:
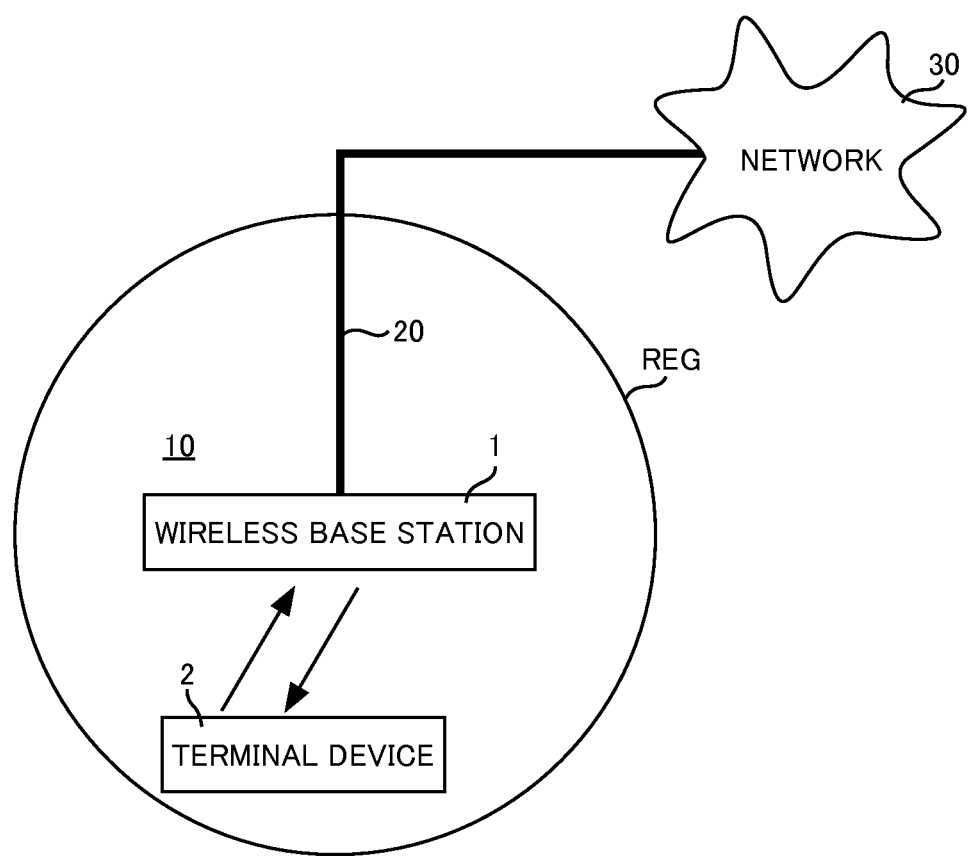
FIG. 1 is a schematic diagram of a wireless communication system according to an embodiment of the present invention.

Embodiments of the present invention will be described in detail with reference to the drawings. The same or corresponding components in the drawings are labeled with the same characters, and their description will not be repeated.

FIG. 1 is a schematic diagram of a wireless communication system according to an embodiment of the present invention. Referring to FIG. 1, a wireless communication system 10 according to an embodiment of the present invention includes a wireless base station 1 and a terminal device 2.

The wireless base station 1 has a communication area REG. The wireless base station 1 is connected to a network 30 via a cable 20.

The wireless base station 1 regularly transmits beacon frames Beacon (i.e. management frames) for managing the terminal device 2, and has an operating mode in which it wirelessly communicates with the terminal device 2 and a sleep mode in which it is not capable of wirelessly communicating (i.e. transmitting and receiving data) with the terminal device 2.

When the wireless base station 1 has not wirelessly communicated with the terminal device 2 in a certain period of time or no terminal device is assigned to it (i.e. no terminal device is present in the communication area REG), the wireless base station 1 transitions from the operating mode to the sleep mode.

When the wireless base station 1 in sleep mode receives, from the terminal device 2, a wakeup signal for activating itself, it transitions from the sleep mode to the operating mode. Then, the wireless base station 1 wirelessly communicates with the terminal device 2 and communicates with other communication devices via the cable 20 and network 30. In this case, the wireless base station 1 may wirelessly communicate with the terminal device 2 in the 2.45 GHz band, for example.

The terminal device 2 is in the communication area REG of the wireless base station 1. When the terminal device 2 does not receive a beacon frame Beacon from the wireless base station 1, it determines that the wireless base station 1 is in sleep mode. When the terminal device 2 attempts to initiate wireless communication with the wireless base station 1 when the wireless base station 1 is in sleep mode, it generates a wakeup signal for activating the wireless base station 1 and wirelessly transmits the generated wakeup signal to the wireless base station 1 in the 2.45 GHz band. In other words, the terminal device 2 uses the same frequency band as that used for wireless communication with the wireless base station 1 to transmit a wakeup signal to the wireless base station 1.

When the wireless base station 1 is in the operating mode, the terminal device 2 performs normal wireless communication with the wireless base station 1 in the 2.45 GHz band.

Figure 2:
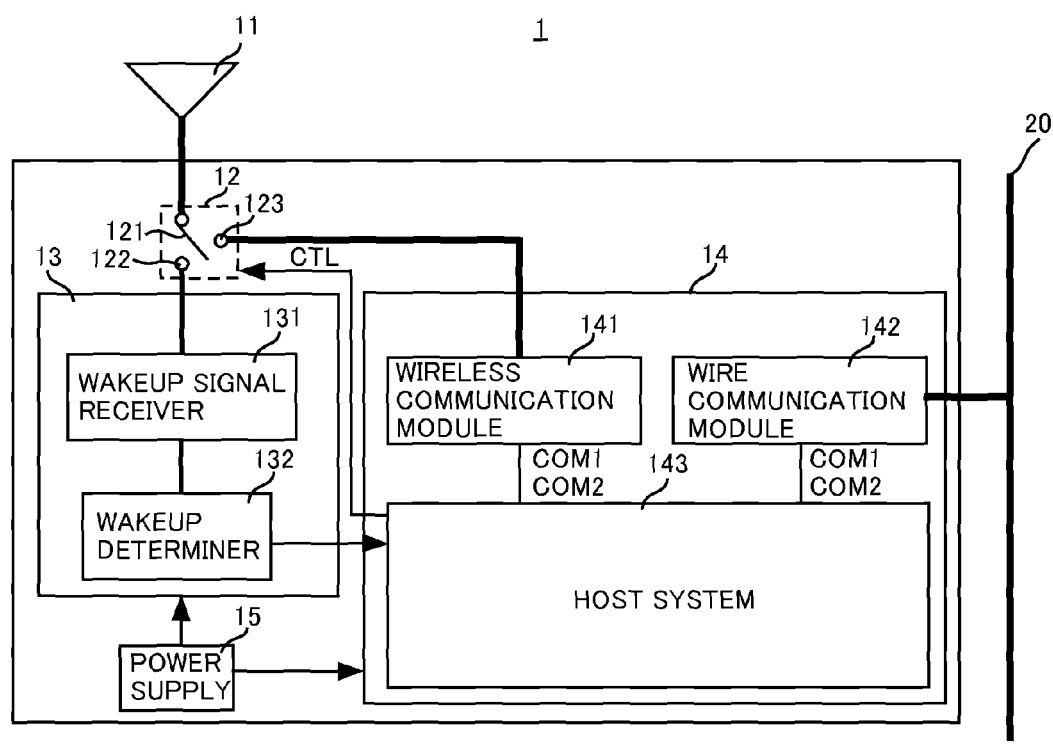
FIG. 2 illustrates a configuration of the wireless base station of FIG. 1.

FIG. 2 illustrates a configuration of the wireless base station 1 of FIG. 1. Referring to FIG. 2, the wireless base station 1 includes an antenna 11, switching device 12, wakeup device 13, main device 14 and power supply 15.

The antenna 11 is connected to the wakeup device 13 or main device 14 via the switching device 12.

The switching device 12 is connected between the antenna 11 and the wakeup device 13 and main device 14.

The antenna 11 receives a packet from the terminal device 2 via wireless communication, and outputs the received packet to the wakeup device 13 or main device 14 via the switching device 12. Further, the antenna 11 transmits a packet received from the main device 14 to the terminal device 2 via wireless communication.

In response to a control signal CTL from the main device 14, the switching device 12 connects the antenna 11 with the wakeup device 13 or main device 14.

The wakeup device 13 may receive 100 μW power, for example, from the power supply 15 and be driven by the received power. When the main device 14 is in sleep mode, the wakeup device 13 is connected to the antenna 11 via the switching device 12. When the wakeup device 13 receives a wakeup signal from the terminal device 2 via the antenna 11, it determines whether a wakeup ID contained in the received wakeup signal is identical with the ID of the wireless base station 1. If the wakeup device 13 determines that the wakeup ID is identical with the ID of the wireless base station 1, it generates a driving signal and outputs the generated driving signal to the main device 14.

If the wakeup ID is not identical with the ID of the wireless base station 1, the wakeup device 13 discards the wakeup signal. The wakeup device 13 then waits for receiving another wakeup signal.

The wakeup device 13 only has the function of receiving packets such as wakeup signals, and does not have the function of transmitting packets.

The main device 14 may receive 7 W power, for example, from the power supply 15 and be driven by the received power.

When the main device 14 is in operating mode, it wirelessly communicates with the terminal device 2 via the antenna 11 and communicates with other communication devices via the cable 20.

When the main device 14 has not wirelessly communicated with the terminal device 2 in a certain period of time T1 or when no terminal device is assigned to the wireless base station 1, the main device 14 transitions from the operating mode to the sleep mode. The certain period T1 may be several dozens of seconds, for example.

Further, when the main device 14 in the sleep mode receives a driving signal from the wakeup device 13, it transitions from the sleep mode to the operating mode.

The power supply 15 supplies 100 μW power to the wakeup device 13 and supplies 7 W power to the main device 14.

The switching device 12 includes a switch 121 and terminals 122 and 123. The wakeup device 13 includes a wakeup signal receiver 131 and a wakeup determiner 132. The main device 14 includes a wireless communication module 141, wire communication module 142 and host system 143.

The switch 121 is connected to the antenna 11. The terminal 122 is connected to the wakeup signal receiver 131. The terminal 123 is connected to the wireless communication module 141.

The switch 121 receives a control signal CTL from the host system 143 of the main device 14. Then, depending on the control signal CTL, the switch 121 connects the antenna 11 with the terminal 122 or terminal 123.

In this case, the control signal CTL may be composed of an L (logical low) level signal or an H (logical high) level signal. If the control signal CTL is composed of an L level signal, the switch 121 connects the antenna 11 with the terminal 122, and, if the control signal CTL is composed of an H level signal, the switch 121 connects the antenna 11 with the terminal 123.

The wakeup signal receiver 131 only has the function of receiving packets and does not have the function of transmitting packets.

The wakeup signal receiver 131 uses a channel, X, at one frequency in the wireless communication band (i.e. the 2.45 GHz band). When the switch 121 is connected to the terminal 122, the wakeup signal receiver 131 waits for a wakeup signal in channel X.

When the wakeup signal receiver 131 receives a wakeup signal via the antenna 11, it demodulates the received wakeup signal and outputs the demodulated wakeup signal to the wakeup determiner 132.

The wakeup determiner 132 holds in advance the ID of the wireless base station 1. The wakeup determiner 132 receives a wakeup signal from the wakeup signal receiver 131. The wakeup determiner 132 extracts the wakeup ID contained in the received wakeup signal.

Then, the wakeup determiner 132 determines whether the wakeup ID is identical with the ID of the wireless base station 1. If the wakeup determiner 132 determines that the wakeup ID is identical with the ID of the wireless base station 1, the wakeup determiner 132 generates a driving signal and outputs the generated driving signal to the host system 143 of the main device 14. If the wakeup determiner 132 determines that the wakeup ID is not identical with the ID of the wireless base station 1, the wakeup determiner discards the extracted wakeup ID.

In the wireless communication module 141, a channel, Z, that can be used for data communication with the terminal device 2 (i.e. a frequency channel with one frequency in the 2.45 GHz band) is preset.

When the wireless communication module 141 receives a command signal COM1 from the host system 143, it transitions from the operating mode to the sleep mode, and, when it receives a command signal COM2 from the host system 143, it transitions from the sleep mode to the operating mode. The sleep mode is a mode in which the wireless communication module 141 is not operating.

Then, when the wireless communication module 141 transitions to the operating mode, it generates a packet for notifying the terminal device 2 that the wireless base station 1 is operating (operation notification), and transmits the generated packet (i.e. the operation notification) to the terminal device 2 in channel Y (i.e. a frequency channel with one frequency in the 2.45 GHz band).

Thereafter, the wireless communication module 141 regularly broadcasts beacon frames Beacon via the antenna 11 to notify entities around it of its presence and that it is in the operating mode. Thereafter, the wireless communication module 141 establishes a wireless communication link with the terminal device 2. Then, the wireless communication module 141 wirelessly communicates with the terminal device 2. In this case, the wireless communication module 141 may retrieve data from a packet received from the terminal device 2 and output the data to the host system 143, and may also generate a packet containing data received from the host system 143 and transmit it to the terminal device 2.

The wire communication module 142 may receive data from other communication devices via the cable 20 and output the received data to the host system 143.

The wire communication module 142 may also receive data from the host system 143 and transmit the received data to other communication devices over the cable 20.

Further, when the wire communication module 142 receives a command signal COM1 from the host system 143, it transitions from the operating mode to the sleep mode, and, when it receives a command signal COM2 from the host system 143, it transitions from the sleep mode to the operating mode. The sleep mode is a mode in which the module is capable of receiving magic packets but is not capable of receiving other packets.

When the host system 143 has not received a packet from the terminal device 2 via the wireless communication module 141 in a certain period T1, or when no terminal device is in the communication area REG, the host system 143 generates a command signal COM1 and outputs the generated command signal COM1 to the wireless communication module 141 and wire communication module 142, and generates a control signal CTL with the L level to output it to the switching device 12. Then, the host system 143 transitions to the sleep mode (i.e. non-operating mode).

When the host system 143 receives a driving signal from the wakeup determiner 132 or wire communication module 142, it transitions from the sleep mode to the operating mode. The host system 143 then generates a command signal COM2 and outputs the generated command signal COM2 to the wireless communication module 141 and wire communication module 142, and generates a control signal CTL with the H level to output it to the switch device 12.

Further, when the host system 143 receives data from the wireless communication module 141, it outputs the received data to the wire communication module 142.

Further, when the host system 143 receives data from the wire communication module 142, it outputs the received data to the wireless communication module 141.

Further, the host system 143 administers one or more terminal devices in the communication area REG.

Figure 3:
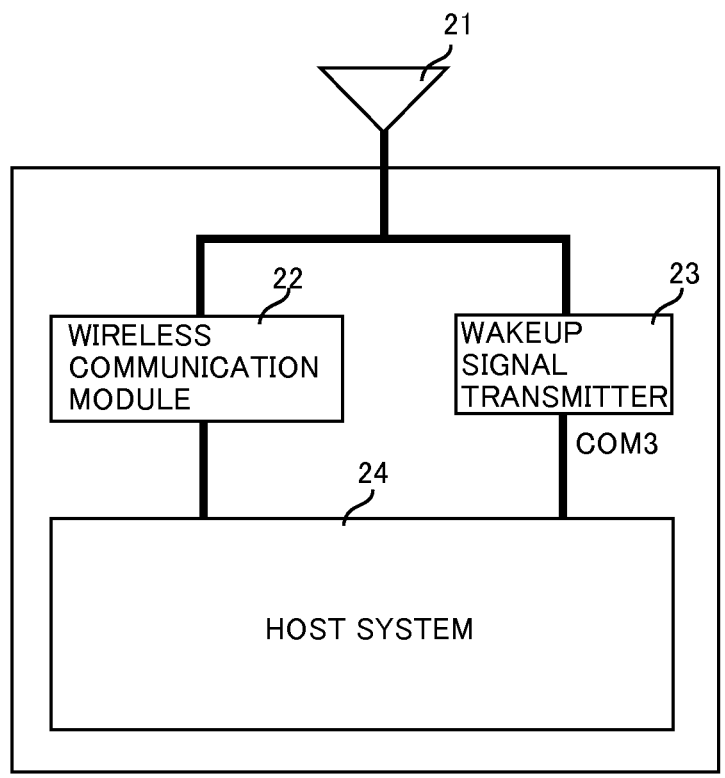
FIG. 3 illustrates a configuration of the terminal device of FIG. 1.

FIG. 3 illustrates a configuration of the terminal device 2 of FIG. 1. Referring to FIG. 3, the terminal device 2 includes an antenna 21, a wireless communication module 22, a wakeup signal transmitter 23, and a host system 24.

In the wireless communication module 22, channel Y which can be used for data communication with the wireless base station 1 is preset. When the wireless communication module 22 receives an operation notification from the wireless base station 1 via the antenna 21, it scans all communication channels, and may identify channel Z which can be used by the wireless base station 1 for data communication. Then, the wireless communication module 22 uses channel Z to establish a wireless communication link with the wireless base station 1 to wirelessly communicate with the wireless base station 1.

In this case, the wireless communication module 22 receives a packet from the wireless base station 1 via the antenna 21, demodulates the received packet to retrieve data, and outputs the retrieved data to the host system 24. The wireless communication module 22 also receives data from the host system 24 and generates a packet containing the received data, modulates the generated packet by means of a modulation technique for a wireless LAN, and transmits the modulated packet to the wireless base station 1 in channel Z via the antenna 21.

If channel Z which can be used by the wireless base station 1 for data communication is contained in the operation notification, the wireless communication module 22 immediately sets its communication channel to channel Z and uses this channel Z to establish a wireless communication link with the wireless base station 1 to wirelessly communicate with the wireless base station 1.

When the wakeup signal transmitter 23 receives a command signal COM3 and an ESSID (or BSSID) from the host system 24, it generates a wakeup ID composed of an ESSID, a BSSID, a hash thereof or the like, and generates a wakeup signal containing the generated wakeup ID. The wakeup ID is information identifying a wireless base station to be activated by the terminal device 2.

The wakeup signal transmitter 23 modulates the wakeup signal by means of an on/off keying modulation technique and transmits the modulated wakeup signal to the wireless base station 1 in channel X via the antenna 21.

On/off keying modulation techniques use transmission rates of several dozens to several hundreds of kbps, which means lower transmission rates than those for modulation techniques used in normal wireless LANs. Wakeup signals are modulated by a modulation technique with a relatively low transmission rate in order to ensure that the wakeup signals can be demodulated by the wakeup device 13 which is operated by 100 µW power, which is very small.

The host system 24 receives from the wireless communication module 22 a beacon frame Beacon that has been received by the wireless communication module 22 via the antenna 21. The host system 24 then retrieves an ESSID or BSSID contained in the received beacon frame Beacon and administers it, and administers the wireless base station 1 to which the terminal device 2 is assigned, based on the ESSID or BSSID.

When the host system 24 receives no beacon frame Beacon from the wireless base station 1, it determines that the wireless base station 1 is in the sleep mode, and outputs a command signal COM3 and ESSID (or BSSID) to the wakeup signal transmitter 23.

Further, the host system 24 receives data from the wireless communication module 22 and generates data to output it to the wireless communication module 22.

Figure 4:
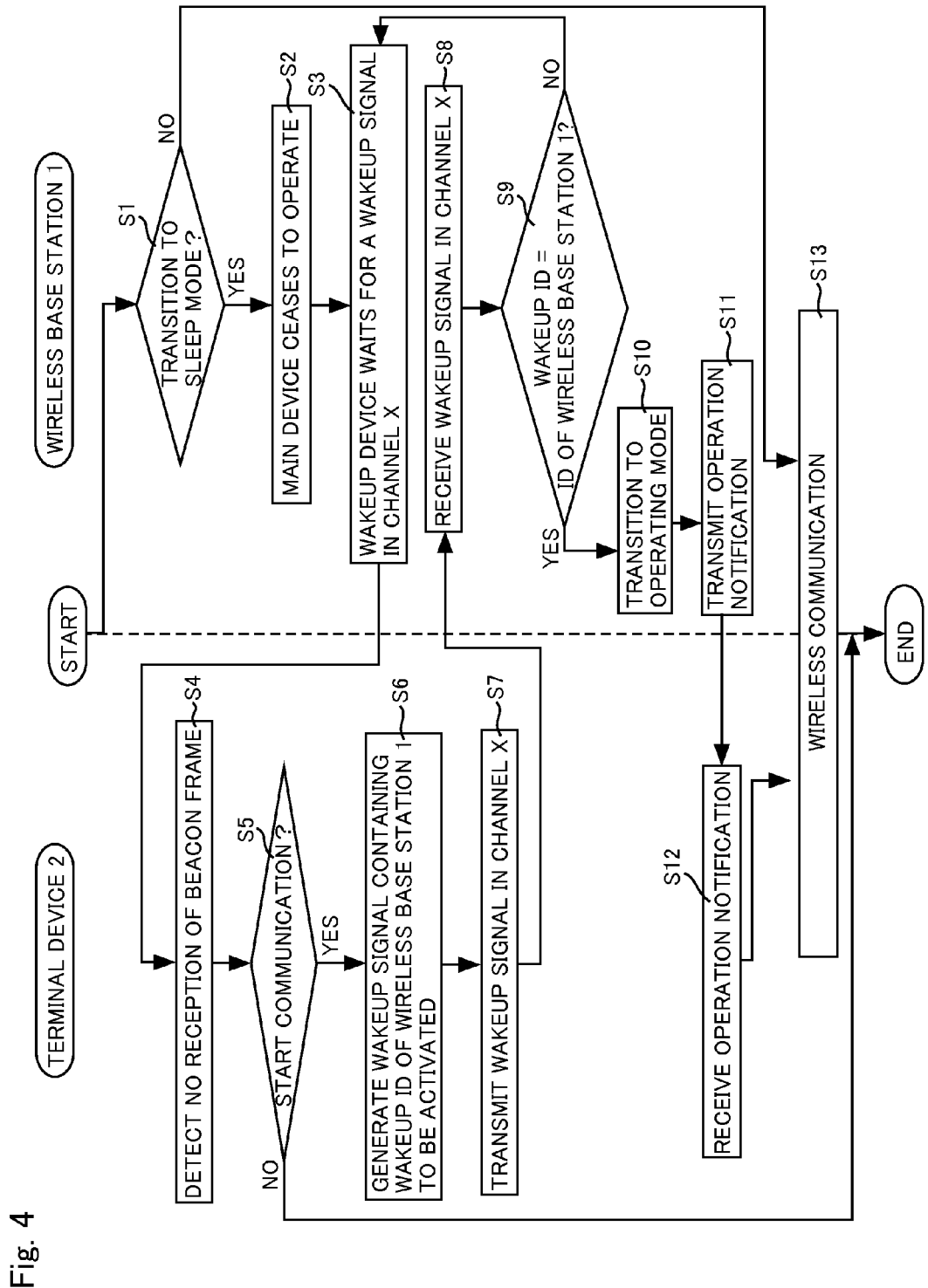
FIG. 4 is a flow chart illustrating how the wireless communication system of FIG. 1 may be operated.

FIG. 4 is a flow chart illustrating how the wireless communication system 10 of FIG. 1 may be operated.

Referring to FIG. 4, upon initiation of the process, the host system 143 of the wireless base station 1 determines whether a transition should be made to the sleep mode (step S1). More specifically, the host system 143 of the wireless base station 1 determines that a transition should be made to the sleep mode if it has not wirelessly communicated with the terminal device 2 in a certain period T1 or no terminal device is assigned to the wireless base station 1. The host system 143 of the wireless base station 1 determines that a transition should not be made to the sleep mode if it has wirelessly communicated with the terminal device 2 within the certain period T1 or a terminal device is assigned to the wireless base station 1.

If it is determined at step S1 that a transition should be made to the sleep mode, the host system 143 of the wireless base station 1 generates a command signal COM1 and outputs it to the wireless communication module 141 and wire communication module 142, and generates a control signal CTL with an L level signal and outputs it to the switching device 12, and then ceases to operate. In response to the control signal CTL with the L level, the switching device 12 of the wireless base station 1 connects the antenna 11 with the terminal 122. In response to the command signal COM1, the wireless communication module 141 and wire communication module 142 of the wireless base station 1 cease to operate. In other words, if it is determined at step S1 that a transition should be made to the sleep mode, the main device 14 ceases to operate (step S2).

Then, the wakeup signal receiver 131 of the wakeup device 13 waits for a wakeup signal in channel X (step S3).

Thereafter, the host system 24 of the terminal device 2 detects that it is not receiving a beacon frame Beacon from the wireless base station 1 (step S4). In other words, the host system 24 of the terminal device 2 detects that the wireless base station 1 is in the sleep mode. Then, the host system 24 of the terminal device 2 determines whether wireless communication should be started (step S5).

If it is determined at step S5 that wireless communication should be started, the host system 24 of the terminal device 2 outputs the ESSID (or BSSID) of the wireless base station 1 to be activated and a command signal COM3 to the wakeup signal transmitter 23. When the wakeup signal transmitter 23 of the terminal device 2 receives the command signal COM3, it generates a wakeup signal in the manner described above based on the ESSID (or BSSID). In other words, the terminal device 2 generates a wakeup signal containing the wakeup ID identifying the wireless base station 1 to be activated (step S6).

Then, the wakeup signal transmitter 23 of the terminal device 2 modulates the wakeup signal by means of an on/off keying modulation technique and transmits the modulated wakeup signal to the wireless base station 1 in channel X via the antenna 21 (step S7).

Then, the wakeup signal receiver 131 of the wireless base station 1 receives the wakeup signal in channel X via the antenna 11 (step S8), and demodulates the received wakeup signal. The wakeup signal receiver 131 of the wireless base station 1 then outputs the demodulated wakeup signal to the wakeup determiner 132.

The wakeup determiner 132 of the wireless base station 1 retrieves the wakeup ID from the demodulated wakeup signal and determines whether the retrieved wakeup ID is identical with the ID of the wireless base station 1 (step S9).

If it is determined at step S9 that the wakeup ID is not identical with the ID of the wireless base station 1, the process returns to step S3.

On the other hand, if it is determined at step S9 that the wakeup ID is identical with the ID of the wireless base station 1, the wakeup determiner 132 of the wireless base station 1 generates a driving signal and outputs it to the host system 143. In response to the driving signal from the wakeup determiner 132, the host system 143 of the wireless base station 1 transitions from the sleep mode to the operating mode, and generates a command signal COM2 and outputs it to the wireless communication module 141 and wire communication module 142. Then, in response to the command COM2, the wireless communication module 141 and wire communication module 142 of the wireless base station 1 transition from the sleep mode to the operating mode. Thus, in response to a driving signal from the wakeup device 13, the main device 14 of the base station 1 transitions from the sleep mode to the operating mode (step S10).

Then, the wireless communication module 141 of the wireless base station 1 generates an operation notification containing the channel Z, and transmits the generated operating notification to the terminal device 2 in channel Y via the antenna 11 (step S11).

Then, the wireless communication module 22 of the wireless device 2 receives the operation notification in channel Y via the antenna 21 (step S12), and outputs the received operation notification to the host system 24. Thereafter, in response to the operation notification from the wireless communication module 22, the host system 24 of the terminal device 2 detects that the wireless base station 1 has transitioned from the sleep mode to the operating mode, and retrieves the channel Z contained in the operation notification. The host system 24 of the terminal device 2 then outputs the retrieved channel Z to the wireless communication module 22.

Then, the wireless communication module 141 of the wireless base station 1 starts wireless communication in channel Z to establish a wireless communication link with the terminal device 2, and the terminal device 2 uses channel Z to establish a wireless communication link with the wireless base station 1 and performs wireless communication (step S13).

If the wireless communication module 22 of the terminal device 2 receives no operation notification from the wireless base station 1 after transmitting a wakeup signal to the wireless base station 1, it scans the channels and receives a beacon frame Beacon to detect that the wireless base station 1 has been activated. Since the beacon frame Beacon contains the channel Z, the wireless communication module 22 of the terminal device 2 can wirelessly communicate with the wireless base station 1 using the channel Z.

If it is determined at step S1 that a transition should not be made to the sleep mode, the process proceeds to step S13.

After step S13, or if it is determined at step S5 that wireless communication should not be started, the process ends.

As discussed above, the wireless base station 1 and terminal device 2 communicate wirelessly with each other in channel Z. The terminal device 2 transmits a wakeup signal to the wireless base station 1 in channel X and the wireless base station 1 receives the wakeup signal in channel X. Channels X and Z are both in the 2.45 GHz band. Thus, the terminal device 2 transmits a wakeup signal using the same communication band as that used by the main device 14 of the wireless base station 1 for wireless communication, and the wakeup device 13 of the wireless base station 1 receives the wakeup signal using the same communication band as that used by the main device 14 for wireless communication.

As such, in the wireless base station 1, the wakeup device 13 and main device 14 share a single antenna 11.

When the wireless base station 1 is in the sleep mode, the terminal device 2 generates a wakeup signal and transmits it to the wireless base station 1 such that the wireless base station 1 transitions from the sleep mode to the operating mode (see steps S6 to S8, "YES" at S9, and S10).

Therefore, the terminal device 2 can remotely cause the wireless base station 1 to transition from the sleep mode to the operating mode.

Further, if a new terminal device entering the communication area REG of the wireless base station 1 does not receive a beacon frame Beacon from the wireless base station 1, it detects that the wireless base station 1 is in the sleep mode, in which case it generates a wakeup signal and transmits it to the wireless base station 1 (see steps S4, "YES" at S5, S6 and S7).

Therefore, a new terminal device entering the communication area REG of the wireless base station 1 can also cause the wireless base station 1 to transition from the sleep mode to the operating mode.

Further, when the terminal device 2 moves out of the communication area REG of the wireless base station 1 and enters the communication area of another wireless base station (i.e. upon handover), the terminal device 2 generates a wakeup signal and transmits it to the other wireless base station to cause this wireless base station to transition from the sleep mode to the operating mode. As such, handover may occur smoothly.

Further, in the case where the wireless communication system 10 includes a plurality of wireless base stations, even if all the wireless base stations are in the sleep mode, a terminal device may cause a desired wireless base station to transition from the sleep mode to the operating mode.

Furthermore, the wakeup device 13 of the wireless base station 1 operates in the sleep mode with 10 μW power, a value that is one hundred-thousandth of the power needed by the main device 14 (i.e. 7 W).

Consequently, power consumption may be significantly reduced.

Figure 5:
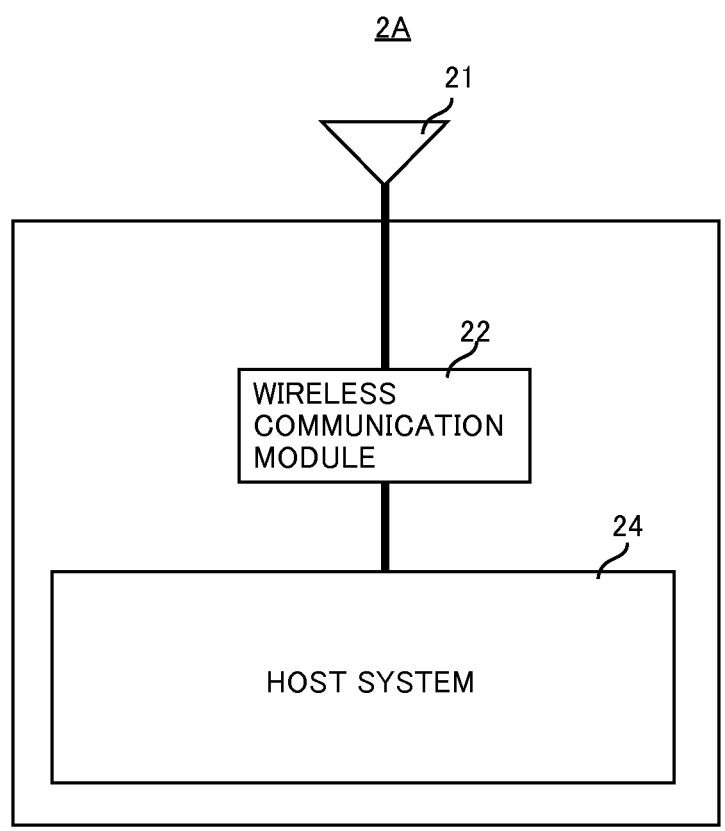
FIG. 5 illustrates another configuration of the terminal device of FIG. 1.

FIG. 5 illustrates another configuration of the terminal device 2 of FIG. 1. In an embodiment of the present invention, the terminal device 2 may be a terminal device 2A of FIG. 5.

Referring to FIG. 5, the terminal device 2A is the same as the terminal device 2 of FIG. 3 except that the wakeup signal transmitter 23 of the terminal device 2 has been removed.

When the host system 24 of the terminal device 2A detects that the wireless base station 1 is in the sleep mode in the manner as described above, it generates a command signal COM3 and outputs it to the wireless communication module 22.

Then, in response to the command signal COM3, the wireless communication module 22 of the terminal device 2A generates a wakeup ID represented by a length, and generates a wakeup signal containing the generated wakeup ID.

Wakeup ID represented by a length, as used herein, means that the length of a wakeup ID identifies a wireless base station; for example, the wakeup ID for activating the wireless base station 1 is represented by the length of 8 bits and the wakeup ID for activating another wireless base station is represented by the length of 16 bits.

Thereafter, the wireless communication module 22 of the terminal device 2A modulates the generated wakeup signal by means of a modulation technique for a wireless LAN and transmits the modulated wakeup signal to the wireless base station 1 in channel X.

Thus, the terminal device 2A modulates a wakeup signal by means of a modulation technique for a wireless LAN (i.e. a modulation technique with a high transmission rate) and transmits it to the wireless base station 1. But, since the wakeup ID contained in the wakeup signal identifies a wireless base station by means of its length, the wakeup device 13 of the wireless base station 1 can obtain the wakeup ID by detecting the length of the wakeup signal even though the wakeup signal is modulated by a modulation technique with a high transmission rate.

In the case where the wireless communication system 10 includes the terminal device 2A in stead of the terminal device 2, too, the wireless communication system 10 operates according to the flow chart of FIG. 4.

In the above description, the main device 14 of the wireless base station 1 (all of the wireless communication module 141, wire communication module 142 and host system 143) ceases to operate when it transitions to the sleep mode. In other words, the sleep mode of the main device 14 of the wireless base station 1 consists of a single sleep level.

Alternatively, in an embodiment of the present invention, the wireless base station 1 may have a sleep mode consisting of a plurality of sleep levels.

A plurality of sleep levels will be described below.

(i) Level 0 (normal operation)

All of the wireless communication module 141, wire communication module 142 and host system 143 are in operating mode.

(ii) Level 1

The wireless communication module 141 is powered off, and the wire communication module 142 and host system 143 are in the sleep mode.

In level 1, if a terminal device is assigned to the wireless base station 1, the host system 143 holds information indicating such assignment in an auxiliary storage device and sleeps while maintaining such assignment (internally in the wireless base station 1).

(iii) Level 2

The wireless communication module 141 and wire communication module 14 are powered off, and the host system 143 is in the sleep mode. In level 2, too, if a terminal device is assigned to the wireless base station 1, the host system 143 holds information indicating such assignment in an auxiliary storage device and sleeps while maintaining such assignment (internally in the wireless base station).

(iv) Level 3

The wireless communication module 141 and host system 143 are powered off and the wire communication module 142 is in the operating mode when the host is in the sleep mode.

In level 3, the wakeup device 13 or wire communication module 142 may receive a driving signal to cause the host system 143 to enter the operating mode. In other words, the wakeup device 13 may receive a wakeup signal as the driving signal from the terminal device 2, and the wire communication module 142 may receive a driving signal from the host to cause the host system 143 to enter the operating mode.

(v) Level 4

All of the wireless communication module 141, wire communication module 142 and host system 143 are powered off.

Level 0 above represents the operating mode while levels 1 to 4 represent a plurality of sleep levels.

In an embodiment of the present invention, any one of levels 1 to 4 above may be selected, and the selected level may be set in the wireless base station 1 as the sleep mode. In this case, when the main device 14 of the wireless base station 1 has not wirelessly communicated with the terminal device 2 in a certain period T1 or no terminal device is assigned to the wireless base station 1, the main device 14 transitions to the sleep mode composed of the set sleep level (i.e. any one of levels 1 to 4).

In an embodiment of the present invention, mode transitions may occur based on communication conditions.

State transition diagrams, which dynamic mode transitions occur, will be described below.

Figure 6:
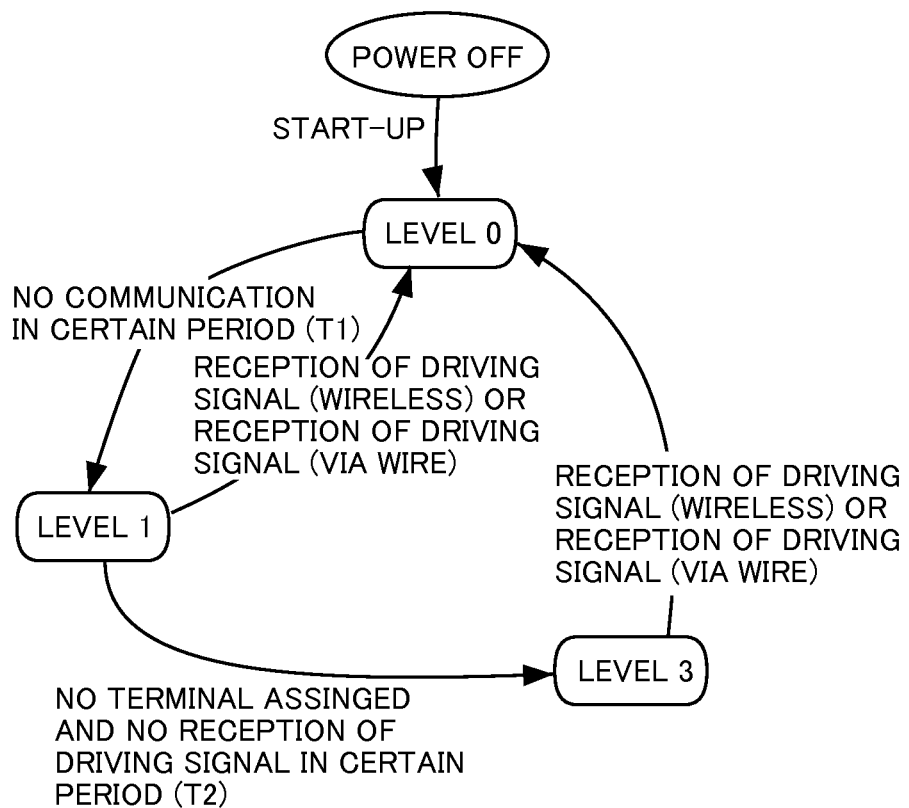
FIG. 6 is a state transition diagram.

FIG. 6 is a state transition diagram. Referring to FIG. 6, the state transition diagram includes the levels 0, 1 and 3.

First, the main device 14 of the wireless base station 1 is powered off and, when activated, transitions to the level 0. Then, in the level 0, the main device 14 of the wireless base station 1 performs operations of the normal operating mode.

When the main device 14 of the wireless base station 1 in the level 0 has not communicated wirelessly with the terminal device 2 in a certain period (T1), it transitions to the level 1. Then, when in the level 1 the wakeup device 13 receives a driving signal (wirelessly) from the terminal device 2 or the wire communication module 142 receives a driving signal (via wire) from the host, the main device 14 of the wireless base station 1 transitions to the level 0. When in the level 1 the main device 14 of the wireless base station 1 has no terminal assigned to it and has not received a driving signal in a certain period (T2), it transitions to the level 3. The certain period T2 may be several dozens of seconds, for example.

When in the level 3 the wakeup device 13 receives a driving signal (wirelessly) from the terminal device 2 or the wire communication module 142 receives a driving signal (via wire) from the host, the main device 14 of the wireless base station 1 transitions to the level 0.

Figure 7:
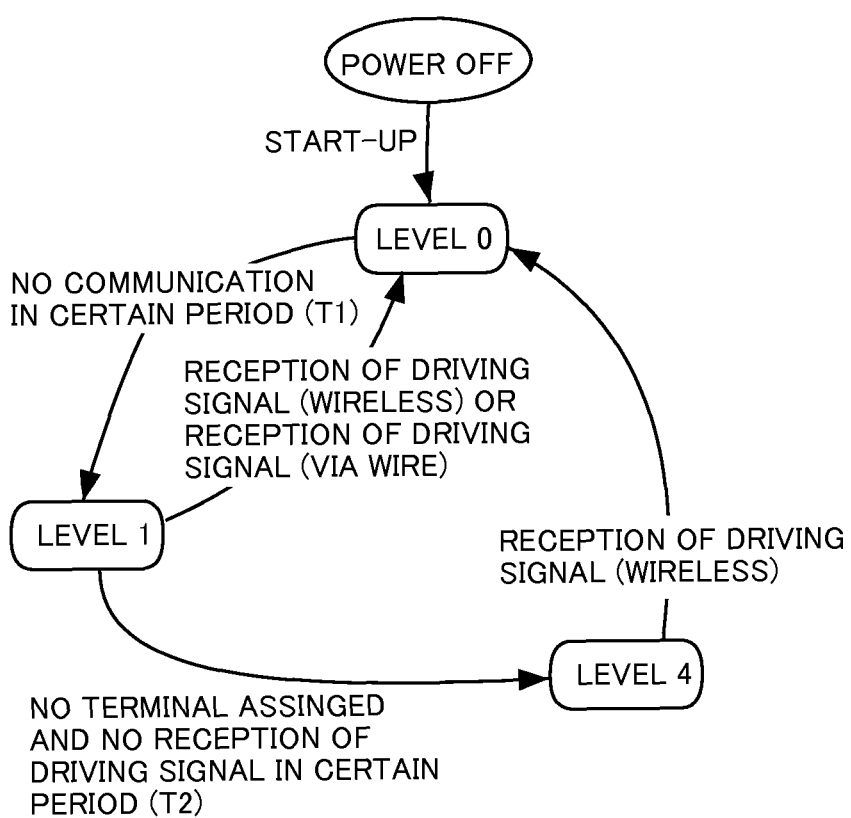
FIG. 7 is another state transition diagram.

FIG. 7 is another state transition diagram. Referring to FIG. 7, the state transition diagram includes the levels 0, 1 and 4.

The state transition diagram of FIG. 7 is the same as that of FIG. 6 except that the level 3 of the state transition diagram of FIG. 6 is replaced by the level 4.

When in the level 1 the main device 14 of the wireless base station 1 has no terminal assigned to it and has not received a driving signal in a certain period (T2), it transitions to the level 4.

When in the level 4 the wakeup device 13 receives a driving signal (wirelessly) from the terminal device 2, the main device 14 of the wireless base station 1 transitions to the level 0.

Otherwise, the description of this state transition diagram is the same as that of the state transition diagram of FIG. 6.

Figure 8:
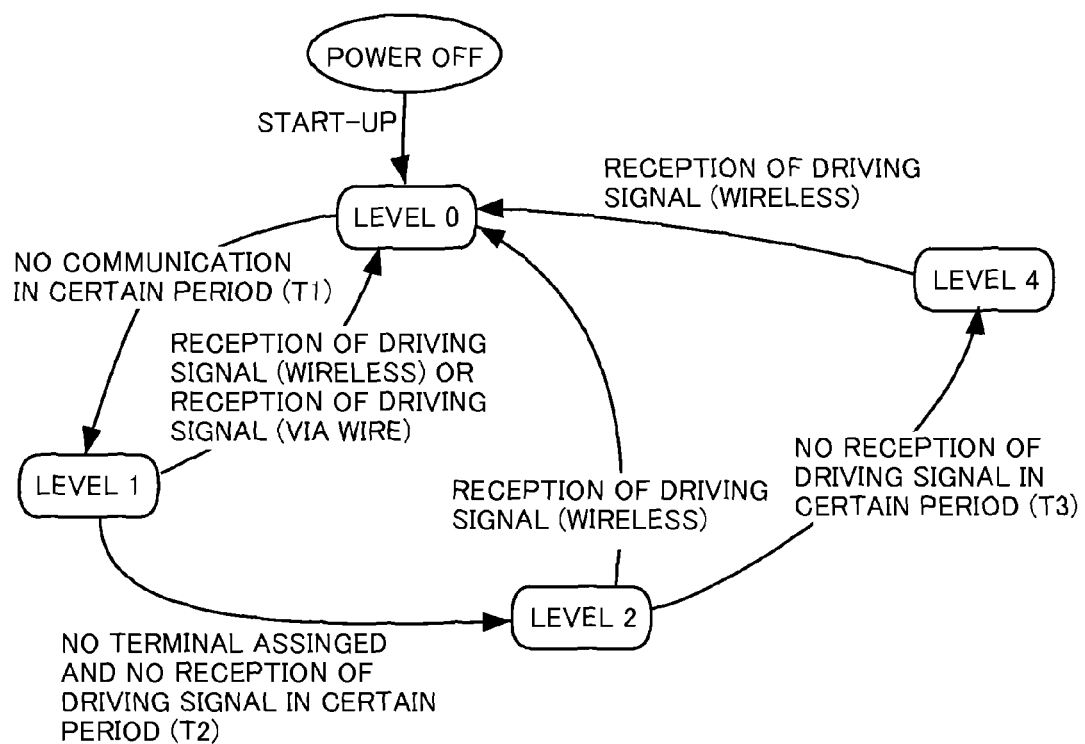
FIG. 8 is still another state transition diagram.

FIG. 8 is still another state transition diagram. Referring to FIG. 8, the state transition diagram includes the levels 0, 1, 2 and 4.

The state transition diagram of FIG. 8 is the same as that of FIG. 7 except that the level 2 is inserted between the levels 1 and 4 of the state transition diagram of FIG. 7.

When in the level 1 the main device 14 of the wireless base station 1 has no terminal assigned to it and has not received a driving signal in a certain period (T2), it transitions to the level 2.

When in the level 2 the wakeup device 13 receives a driving signal (wirelessly) from the terminal device 2, the main device 14 of the wireless base station 1 transitions to the level 0. When in the level 2 the main device 14 of the wireless base station 1 has not received a driving signal in a certain period (T3), it transitions to the level 4. The certain period T3 may be several minutes, for example.

Otherwise, the description of this state transition diagram is the same as that of the state transition diagrams of FIGS. 6 and 7.

Figure 9:
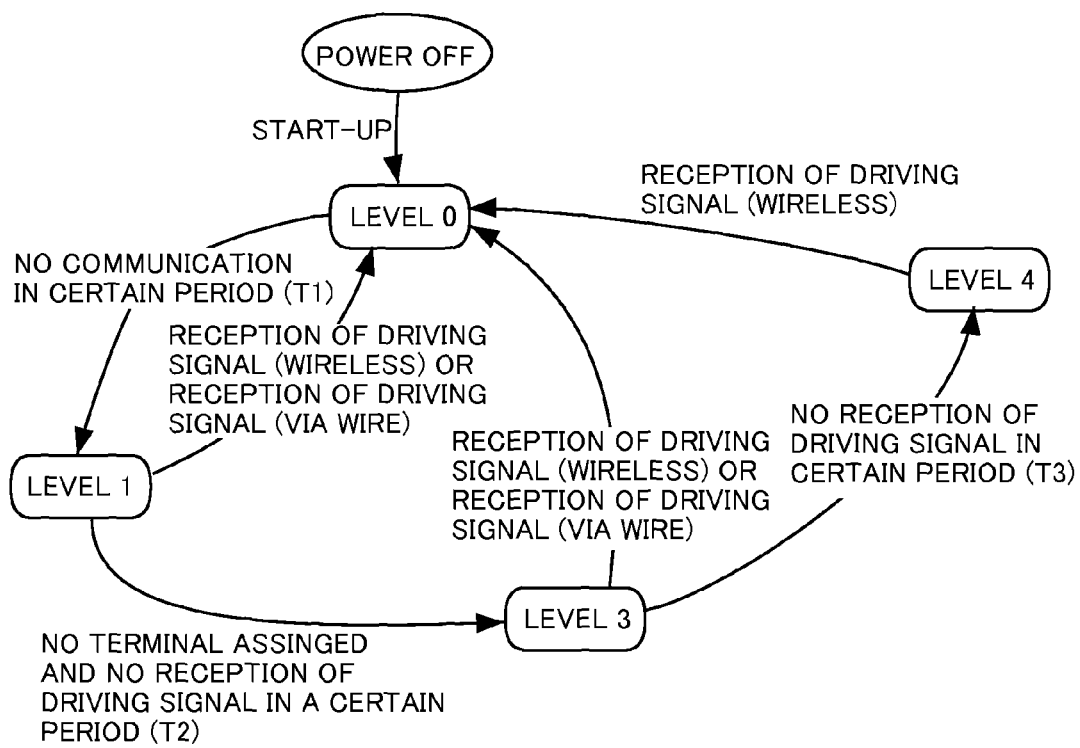
FIG. 9 is yet another state transition diagram.

FIG. 9 is yet another state transition diagram. Referring to FIG. 9, the state transition diagram includes the levels 0, 1, 3 and 4.

The state transition diagram of FIG. 9 is the same as that of FIG. 8 except that the level 2 of the state transition diagram of FIG. 8 is replaced by the level 3.

When in the level 1 the main device 14 of the wireless base station 1 has no terminal assigned to it and has not received a driving signal in a certain period (T2), it transitions to the level 3.

When in the level 3 the wakeup device 13 receives a driving signal (wirelessly) from the terminal device 2 or the wire communication module 142 receives a driving signal (via wire) from the host, the main device 14 of the wireless base station 1 transitions to the level 0. When in the level 3 the main device 14 of the wireless base station 1 has not received a driving signal in a certain period (T3), it transitions to the level 4.

Otherwise, the description of this state transition diagram is the same as that of the state transition diagrams of FIGS. 6 to 8.

Accordingly, the main device 14 of the wireless base station 1 may transition from one state to another according to any one of the state transition diagrams of FIGS. 6 to 9 discussed above. In this case, the wireless communication module 141, wire communication module 142 and host system 143 may be separately powered off or enter the sleep mode according to the plurality of sleep levels.

In an embodiment of the present invention, if a terminal device is assigned to the wireless base station 1 when the main device 14 of the wireless base station 1 determines that a transition should be made to the sleep mode, the main device 14 may query the terminal device as to whether a transition may be made to the sleep mode and, if the terminal device permits this, transition to the sleep mode. In this case, when the terminal device 2 receives a query signal from the wireless base station 1, it transmits to the wireless base station 1 a signal for permitting a transition to the sleep mode if it does not plan to start wireless communication with the wireless base station 1.

Thus, the wireless base station 1 may transition to the sleep mode after it determines that there will be no wireless communication between the wireless base station 1 and terminal device 2.

In the above description, the wakeup signal is modulated by an on/off keying modulation technique; alternatively, in an embodiment of the present invention, the wakeup signal may be modulated by other modulation techniques such as ASK or FSK.

It should be understood that the embodiments disclosed herein are exemplary in every respect and not limiting. It is contemplated that the scope of the present invention is defined by the Claims and not by the above description of the embodiments, and includes all modifications within the spirit and scope equivalent to those of the Claims.

INDUSTRIAL APPLICABILITY

The present invention is useful in a wireless base station and wireless communication systems using the same.

The invention claimed is:

1. A wireless base station comprising:
a main device regularly transmitting a management frame for managing a terminal device, having an operating mode in which the main device communicates wirelessly with the terminal device and a sleep mode in which the main device ceases to operate, and transitioning from the operating mode to the sleep mode when it has not communicated wirelessly with the terminal device in a certain period of time or when no terminal device is assigned to the wireless base station, the main device being configured to wirelessly communicate with the terminal device by modulating and/or demodulating data to be transmitted and/or received in the operating mode using a first modulation technique whose transmission rate is a first transmission rate; and
a wakeup device configured, when the main device is in the sleep mode and when the wakeup device receives, from a first terminal device starting access to the main device, a wakeup signal for causing the main device to transition from the sleep mode to the operating mode, to cause the main device to transition from the sleep mode to the operating mode, the wakeup device having a function of receiving packets from outside of the wireless base station via an antenna without a function of transmitting packets out of the wireless base station via the antenna,
wherein the wakeup device receives the wakeup signal from the first terminal device in the same frequency band as that used by the main device for wireless communication, the wakeup signal having been modulated by a second modulation technique with a second transmission rate lower than the first transmission rate for data transmission and reception by the main device in the operating mode, the wakeup signal containing information identifying a wireless base station to be activated by the first terminal device, and demodulates the received wakeup signal to cause the main device to transition from the sleep mode to the operating mode.

2. The wireless base station according to claim 1, wherein, if the main device is to transition from the operating mode to the sleep mode when a terminal device is assigned to the wireless base station, the main device transmits, to every terminal device assigned to the wireless base station, a query signal for querying whether the main device is allowed to transition to the sleep mode and, if the every terminal device permits the main device to transition to the sleep mode, transitions to the sleep mode.

3. The wireless base station according to claim 1, wherein the sleep mode includes a plurality of sleep levels,
wherein the main device includes:
a wireless communication module wirelessly communicating with the terminal device in the operating mode,
a wire communication module connected to a network via a cable, and
a host system controlling the wireless communication module and the wire communication module, and wherein the wireless communication module, the wire communication module and the host system are separately powered off or enter the sleep mode according to the sleep levels.

4. A wireless communication system comprising:
the wireless base station according to claim 1, and
a terminal device transmitting the wakeup signal to the wireless base station when the terminal device starts wireless communication with the wireless base station when the wireless base station is in the sleep mode.

5. The wireless communication system according to claim 4, wherein the terminal device modulates, by means of a wireless LAN modulation technique, the wakeup signal with a length that provides information for identifying the wireless base station, and transmits it to the wireless base station.

* * * * *